April 1, 1969 G. J. YAGUSIC 3,436,607

DELAY ON DE-ENERGIZATION ELECTRONIC TIMER CIRCUIT

Filed Nov. 21, 1966

INVENTOR.
George J. Yagusic
BY
Stephen A. Roen
ATTORNEY

United States Patent Office 3,436,607

Patented Apr. 1, 1969

3,436,607

DELAY ON DE-ENERGIZATION ELECTRONIC TIMER CIRCUIT

George J. Yagusic, Litchfield, Conn., assignor to General Time Corporation, Stamford, Conn., a corporation of Delaware Filed Nov. 21, 1966, Ser. No. 595,993
Int. Cl. H01h 47/18, 47/32
U.S. Cl. 317—142 10 Claims

ABSTRACT OF THE DISCLOSURE

A delay on de-energization electronic timer using a single relay. The functions of the second relay normally employed to short out the timing capacitor and to initially energize the load controlling relay are performed by a single diode. This diode furnishes a path for energizing the load relay and blocks the path that would otherwise result shorting the timing capacitor after the ON-OFF switch is opened to initiate the timing interval.

*Related application*

Figure 1:
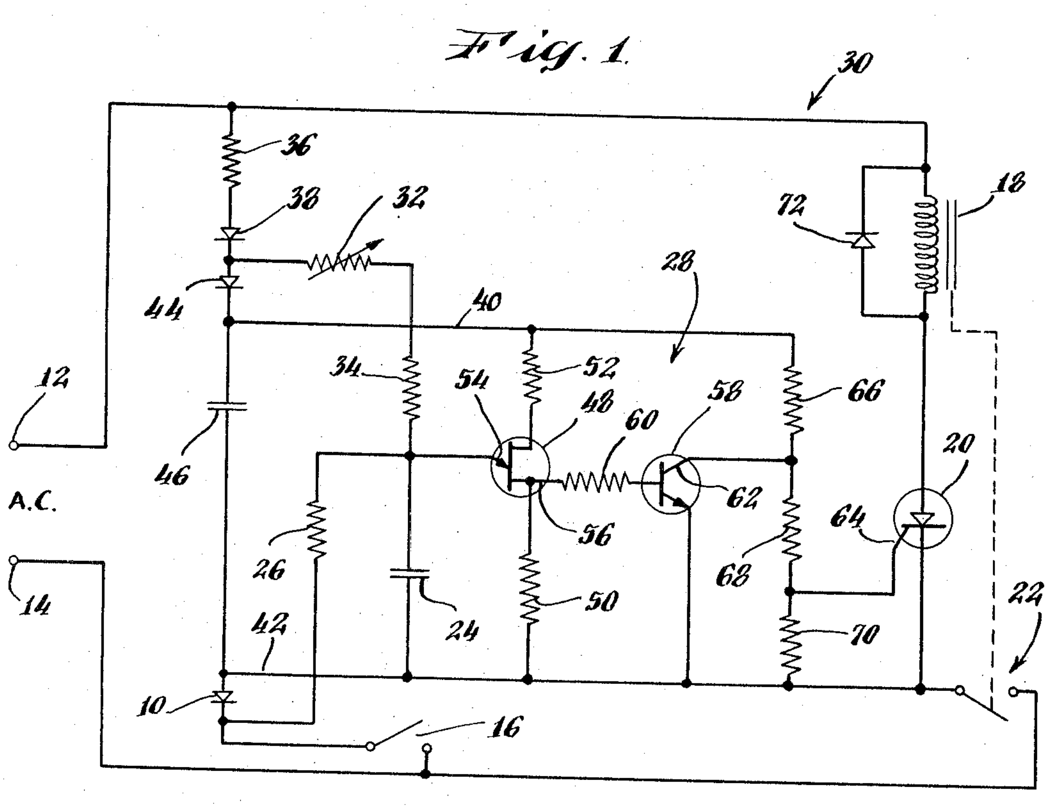

The electronic timer circuit disclosed herein to which the present invention is applied is also disclosed in the copending application of Edward T. Bosman, entitled, "Electronic Timers," filed herewith. That application, which is assigned to the same assignee as the present application, is incorporated herein by reference.

This application is also closely related to the United States patent applications of Klaus D. Wallentowitz, Ser. No. 405,503, filed Oct. 21, 1964; Ser. No. 589,336, filed Oct. 25, 1966; and, Ser. No. 591,016, filed Oct. 31, 1966 all entitled "Electronic Timer Circuit(s)"; and to the applications of Robert S. Lundin, Ser. No. 472,844, filed July 19, 1965, entitled "Condition Responsive Input Controllers"; Ser. No. 479,553, filed Aug. 13, 1965, entitled "Condition Responsive Process Timer"; Ser. No. 589,335, filed Oct. 25, 1966, entitled "Relay Circuit for Half-Wave Alternating Current Energization and Electronic Timer Employing the Same"; and, Ser. No. 591,016, filed Oct. 31, 1966, entitled "Electronic Timer Circuits." All of the above applications are assigned to the assignee of the present application and are incorporated herein by reference.

*Background of the invention*

This application relates to delay on de-energization electronic timers. More particularly, it relates to such timers employing an output relay energized upon the closing of an ON-OFF switch which remains energized for a predetermined time delay subsequent to the opening of the ON-OFF switch, the time delay being provided by a resistor-capacitor network. The above-identified co-pending application of Robert S. Lundin entitled "Relay Circuit for Half-Wave Alternating Current Energization and Electronic Timer Employing the Same" discloses circuitry for operating an electrical mechanical load relay under control of a silicon-controlled rectifier (SCR) from half-wave alternating current. The above-identified co-pending applications of Klaus D. Wallentowitz, Ser. No. 589,336, filed Oct. 25, 1966, and Ser. No. 591,016, filed Oct. 31, 1966 disclose a uni-junction transistor detection circuit for capacitor governed timers and the charging of such capacitor circuits from half-wave alternating current. Furthermore, the last mentioned co-pending application of Klaus D. Wallentowitz discloses an electronic timer circuit that may be utilized in diverse timer applications.

In the past when it has been desired to operate these timers or any timers of the prior art as delay on de-energization timers, that is, timers in which an ON-OFF switch is closed to energize a load and the load remains energized for a predetermined time delay subsequent to opening the ON-OFF switch, a second control relay has been provided. This control relay, according to the prior art, is normally provided with two pairs of contacts. The first pair shorting out the timing capacitor of the timer upon closure of the ON-OFF switch; the second pair furnishing an initial energization path to the timer and load relay. Also according to the prior art, the load relay is provided with holding contacts so that once energized it and the timer circuits remain energized until completion of the time delay.

The second relay is a major item in the cost of a delay on de-energization electronic timer. Relays are inherently less reliable, require more power and dissipate more heat than other electronic components. It is highly desirable to eliminate this relay, substituting less expensive and more trouble free components.

Since electronic delays on de-energization timers are often incorporated into other complex equipment such as photocopier, it is desirable that they be controlled by a single pair of contacts i.e. a single pole, single throw ON-OFF switch.

*Summary of the invention*

It is, therefore, an object of the present invention to provide a delay on de-energization electronic timer.

Another object of the invention is to provide a delay on de-energization electronic timer having a single load controlling relay.

Still another object of the invention is to provide a delay on de-energization electronic timer controlled by a single pole, single throw ON-OFF switch.

A further object of the invention is to provide a delay on de-energization electronic timer of the above character at lower cost than hithertofore possible.

A still further object of the invention is to provide a delay on de-energization electronic timer of the above character having increased reliability.

Still another object of the invention is to provide a delay on de-energization electronic timer of the above character requiring less power and dissipating less heat than hithertofore possible.

Other objects of the invention will in part be obvious and will in part appear hereinafter.

The invention accordingly comprises the features of construction, combinations of electronic elements and an electronic circuit as exemplified in the circuits disclosed herein. The scope of the invention is indicated in the claims.

In general, the present invention comprises connecting the diode 10 of FIGURE 1, as shown. Terminals 12 and 14 are connected to a source of alternating current. When ON-OFF switch 16 is closed, load relay 18 is energized through SCR 20 and diode 10 with half-wave alternating current. Holding contacts 22 close, shorting out ON-OFF switch 16 and diode 10, so that when switch 16 is opened, relay 18 remains energized. Closure of ON-OFF switch 16 prevents timing capacitor 24 from being charged, it being effectively shorted through a low resistance shorting resistor 26. When ON-OFF switch 16 is opened, diode 10 prevents discharge of timing capacitor 24 through resistor 26. When capacitor 24 becomes fully charged, this is recognized by detection circuitry, generally indicated at 28, and SCR 20 is turned off, de-energizing load relay 18.

*The drawings*

Figure 2:
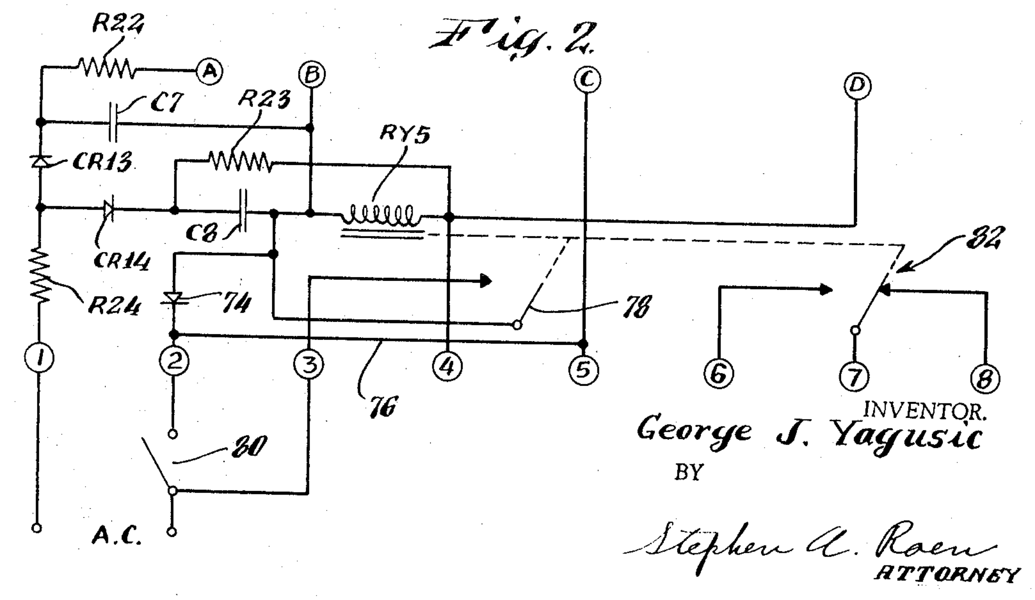

For a fuller understanding of the nature and objects of the invention, reference should be had to the following detailed description taken in connection with the accompanying drawing, in which:

FIGURE 1 is a schematic electrical circuit diagram of a delay on de-energization electronic timer according to the present invention; and, FIGURE 2 is a schematic electrical circuit diagram of external circuitry according to the present invention for providing a delay on de-energization function using a general purpose electronic timer circuit disclosed in the above-identified co-pending applications of Robert S. Lundin and Klaus D. Wallentowitz filed Oct. 31, 1966.

*Specific description*

More specifically referring to FIGURE 1, a preferred form of delay on de-energization timer is generally indicated at 30. As previously explained, it comprises a load relay 18. Energization of relay 18 is controlled by an SCR 20. The timer delay is controlled by capacitor 24, charged through variable resistor 32 and fixed resistor 34. The timing capacitor 24 is charged with half-wave rectified alternating current. Power is supplied at alternating current terminals 12 and 14 adapted for connection to a source of 117 volt alternating current. This is applied through a voltage dropping and surge protecting resistor 36 and rectifying diode 38 to the charging circuit of resistors 32 and 34 and capacitor 24.

Filtered direct current is supplied between positive DC bus 40 and negative DC bus 42 by isolating diode 44 and a filter capacitor 46. When capacitor 24 has been charged to a predetermined potential, this is detected by voltage detection circuit generally indicated at 28. This circuit comprises a uni-junction transistor 48, the bases of which are connected via resistors 50 and 52 to the negative and the positive DC buses 42 and 40. When the predetermined charge potential across capacitor 24 is reached, uni-junction 48 fires and a large current flows from its emitter 54 to its base 56. This current turns ON amplifying transistor 58 whose base is connected to base 56 of uni-junction 48 through resistor 60. When transistor 58 is turned ON, there is an effective short between its collector 62 and the negative DC bus 42. Thus, there is no potential between the triggers 64 of SCR 20 and the negative bus 42, and SCR 20 turns OFF preventing any current flow therethrough. This de-energizes relay 18 to terminate the delay.

When the ON-OFF switch 16 is initially closed, a build-up in charge across capacitor 24 is prevented because resistor 26 is connected across capacitor 24 by a circuit including ON-OFF switch 16 and holding contacts 22 of relay 18. Also biasing current is supplied to trigger 64 through biasing resistors 66, 68 and 70.

As previously explained, when ON-OFF switch 16 is opened, resistor 26 is no longer effectively connected across capacitor 24, due to the blocking action of diode 10, and a timing function is initiated. DC bus 42 continues to be energized through holding contacts 22. When the SCR 20 is turned OFF, relay 18 is deenergized and its holding contacts 22 open to de-energize both the timer 30 and its load circuit, comprising relay 18 and SCR 20. Relay 18 is, of course, provided with load controlling contacts (not shown) as desired by the customer. Furthermore, relay 18 quickly de-energizes through diode 72, as explained in the above-identified co-pending application of Robert S. Lundin, Ser. No. 589,335 filed Oct. 25, 1966.

The circuit of FIGURE 1 is a 90 second delay on de-energization timer when electronic components having the following values are used: Diode 10 is type DE50; diode 38 is type DE200; and diode 44 is type DE50, all supplied by Semiconductor Products. Timing capacitor 24 is a 50 microfarad, 25 volt, DC capacitor and capacitor 46 is a 20 microfarad, 35 volt, DC capacitor. Resistor 36 is 5 kilohms, rated at 2 watts. Potentiometer 32 is 750 kilohms, rated at ½ watt. Resistor 26 is 22 ohms; resistor 34, 33 kilohms; resistors 50 and 52, each 100 ohms; resistor 60, 1 kilohm; resistor 66, 1 kilohm; resistor 68, 4.7 kilohms; resistor 70, 1 kilohm; all rated at ½ watt. Uni-junction transistor 48 may be a type TIS43 supplied by Texas Instruments; transistor 58, a type 2N3705; SCR 20, a type C106B1 supplied by General Electric; and diode 72, a type DE200 supplied by Semiconductor Products. Relay 18 may be a 48 volt direct current relay.

Now referring to FIGURE 2, the interval timer shown in FIGURE 3 of the above-identified application of Klaus D. Wallentowitz, Ser. No. 591,016, filed Oct. 31, 1966, may be converted into a delay on de-energization timer as shown in FIGURE 2 herein, by connecting diode 74, conductor 76, and ON-OFF switch 80, and by eliminating a contact connecting relay swinger 78 to terminal 5 on de-energization of relay RY5.

The timer illustrated in FIGURE 2 operates as follows: Closure of ON-OFF switch 80 energizes relay RY5, power being supplied from terminal A through an SCR in the general purpose timer circuit (not shown) to terminal D through relay RY5 and through diode 74. Relay RY5 energizes and swinger 78 then provides a holding path from terminal 3. Furthermore, the timing capacitor (not shown) which is connected in circuit with terminals B and C is shorted out while ON-OFF switch 80 is closed via conductor 76, ON-OFF switch 80, and relay swinger 78. When ON-OFF switch 80 is opened, terminals B and C are no longer shorted; diode 74 providing a blocking action. At the end of the timer interval, power is no longer supplied at terminal D, thus de-energizing relay RY5. The load may be controlled by contacts generally indicated at 82.

The components shown in FIGURE 2 may have the same values as those described with the same reference characters in the above-identified Wallentowitz application, Ser. No. 591,016, filed Oct. 31, 1966.

It will thus be seen that the objects set forth above among those made apparent from the preceding description are efficiently attained and since certain changes may be made in the above circuits without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A delay on de-energization electronic timer comprising:

(A) an electronic switch
  (a) having a pair of controlled terminals and a control terminal;

(B) a relay
  (a) having a pair of energization terminals and at least a pair of controlled contacts,
  (b) said energization terminals, said controlled terminals, and said controlled contacts connected in series to a source of electrical energy;

(C) a unidirectional conductive device;

(D) an ON-OFF switch
  (a) said ON-OFF switch and said unidirectional conductive device connected in series across said controlled contacts of said relay; and, (E) a timing capacitor connected in circuit for controlling said control terminal of said electronic switch
  (a) said ON-OFF switch and said controlled contacts of said relay connected in circuit with said timing capacitor for discharging the same when both are closed.

2. A delay on de-energization electronic timer as defined in claim 1 and;

(F) a low resistance connected in circuit with said timing capacitor, said ON-OFF switch, and said controlled contacts of said relay.

3. A delay on de-energization electronic timer as defined in claim 2 wherein said unidirectional conductive device is a semiconductor diode.

4. A delay on de-energization electronic timer as defined in claim 1 wherein said electronic switch is a silicon-controlled rectifier.

5. A delay on de-energization electronic timer as defined in claim 4 wherein said unidirectional conductive device is a semiconductor diode.

6. A delay on de-energization electronic timer as defined in claim 1 wherein said unidirectional conductive device is a semiconductor diode.

7. A delay on de-energization electronic timer as defined in claim 1 and;

(F) a detector circuit
  (a) for detecting the charging of said timing capacitor and controlling the control terminal of said electronic switch,
  (b) said unidirectional conductive device connected to supply power to said detector circuit when said ON-OFF switch is initially closed, and
  (c) said controlled terminals of said relay connected to supply power to said detector circuit when they are closed.

8. A delay on de-energization electronic timer as defined in claim 7 wherein said electronic switch is a silicon-controlled rectifier.

9. A delay on de-energization electronic timer as defined in claim 8 wherein said unidirectional conductive device is a semiconductor diode.

10. A delay on de-energization electronic timer as defined in claim 7 wherein said unidirectional conductive device is a semiconductor diode.

References Cited

UNITED STATES PATENTS

| | | | |
|---|---|---|---|
| 2,964,687 | 12/1960 | Eakin | 317—142 |
| 3,201,651 | 8/1965 | Calhoun | 317—142 |
| 3,214,641 | 10/1965 | Sonnemann | 317—142 |
| 3,386,013 | 5/1968 | Hirsch | 317—142 |

JOHN F. COUCH, *Primary Examiner.*

DENNIS HARNISH, *Assistant Examiner.*

U.S. Cl. X.R.

307—293; 317—148.5